United States Patent [19]

Dirksing et al.

[11] Patent Number: 4,578,028
[45] Date of Patent: Mar. 25, 1986

[54] EXPANDABLE CORE PIN FOR BLOW-MOLDING A CONTAINER HAVING A NECK-PORTION WITH INTERNAL ATTACHMENT MEANS

[75] Inventors: William P. Dirksing; Marvin G. Leman; Robert H. Van Coney, all of Cincinnati, Ohio

[73] Assignee: The Procter & Gamble Company, Cincinnati, Ohio

[21] Appl. No.: 678,623

[22] Filed: Dec. 6, 1984

[51] Int. Cl.[4] ..................... B29C 17/07; B29C 17/02
[52] U.S. Cl. ..................... 425/525; 264/533; 249/59; 249/177; 249/180; 249/184; 425/457
[58] Field of Search ................. 249/59, 178, 179, 180, 249/184; 425/525, 535, 457

[56] References Cited

U.S. PATENT DOCUMENTS

| | | | |
|---|---|---|---|
| 2,818,618 | 1/1958 | Winship et al. | 22/173 |
| 3,032,823 | 5/1962 | Sherman | 264/533 |
| 3,048,889 | 8/1962 | Fischer et al. | 18/5 |
| 3,125,801 | 3/1964 | Fields | 29/421 |
| 3,247,548 | 4/1966 | Fields et al. | 18/34 |
| 3,279,739 | 10/1966 | Long | 249/181 |
| 3,279,740 | 10/1966 | Long | 249/181 |
| 3,279,741 | 10/1966 | Long | 249/181 |
| 3,314,106 | 4/1967 | Latreille et al. | 18/5 |
| 3,339,242 | 9/1967 | Lamb | 18/42 |
| 3,482,815 | 12/1969 | Naturale | 249/180 |
| 3,531,556 | 9/1970 | Mehnert | 264/98 |
| 3,534,435 | 10/1970 | John | 18/5 |
| 3,618,170 | 11/1971 | Owens | 18/30 |
| 3,632,264 | 1/1972 | Butcher | 425/326 |
| 3,655,323 | 4/1972 | Hall | 425/438 |
| 3,660,001 | 5/1972 | Roehr | 425/396 |
| 3,718,419 | 2/1973 | Adamo | 425/438 |
| 3,737,277 | 6/1973 | Uhlig | 425/438 |
| 3,843,088 | 10/1974 | McLoughlin et al. | 249/144 |
| 3,865,529 | 2/1975 | Guzzo | 425/249 |
| 3,940,227 | 2/1976 | Strasser | 425/392 |
| 3,969,060 | 7/1976 | Rosenkranz et al. | 425/387 B |
| 4,107,249 | 8/1978 | Murai et al. | 264/68 |
| 4,115,496 | 9/1978 | Krall | 264/94 |
| 4,238,180 | 12/1980 | Gordon et al. | 425/403 |
| 4,382,769 | 5/1983 | Younkin et al. | 425/525 |
| 4,383,819 | 5/1983 | Letica | 425/577 |
| 4,397,629 | 8/1983 | Akutsu et al. | 425/525 |
| 4,456,214 | 6/1984 | Ruck et al. | 249/144 |

Primary Examiner—J. Howard Flint, Jr.
Attorney, Agent, or Firm—Richard C. Witte; John V. Gorman; Ronald J. Snyder

[57] ABSTRACT

A radially expandable core pin is disclosed for blow-molding a thermoplastic container having a body-portion and a neck-portion, with such neck-portion including a dispensing orifice and internal attachment means. The core pin is radially expandable to compression mold the internal attachment means of the container and comprises a plurality of circumferentially disposed core sections surrounding the central axis of the core pin. These core sections are radially movable between a normally collapsed position and an expanded position, and have outer surfaces which mate along their longitudinal adjacent sides when radially displaced to expanded position to form a substantially continuous neck-forming surface thereabout. The neck-forming surface is relieved in a predetermined pattern to form the internal attachment means of the container. The core pin also includes expansion means for moving the core sections to expanded position, and blowing means formed through the core pin and adapted to be connected to a pressure source. The blowing means provides blow-molding pressure for forming the body portion of the thermoplastic container.

8 Claims, 8 Drawing Figures

Fig. 4
Fig. 5
Fig. 6
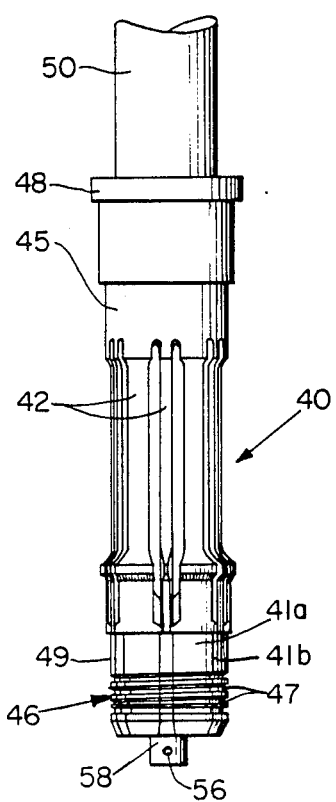
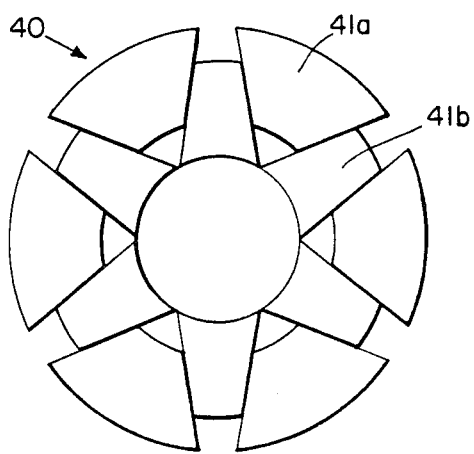
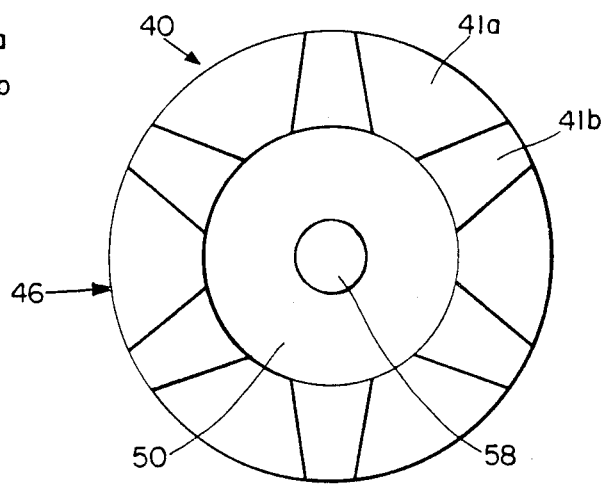

EXPANDABLE CORE PIN FOR BLOW-MOLDING A CONTAINER HAVING A NECK-PORTION WITH INTERNAL ATTACHMENT MEANS

TECHNICAL FIELD

This invention relates to an expandable core pin for blow-molding thermoplastic containers, and, more particularly, to an expandable core pin for blow-molding a thermoplastic container having a neck-portion including internal attachment means therewithin.

BACKGROUND ART

Expandable/collapsible structures for use in molding articles are relatively abundant in the art. U.S. Pat. No. 3,247,548, which issued to M. R. Fields et al. on Apr. 26, 1966, for example, discloses a radially contractable and expandable die for injection-molding an article having a cavity and a continuous annular radial deformation in that cavity. In particular, the Fields et al. apparatus is expandable to a molding position wherein the expanded apparatus provides a portion of a mold member for injection-molding articles such as plastic caps having internal attachment threads. After injection-molding and sufficient cooling, the apparatus is collapsed and withdrawn from the molded cap without interference with the helical threads formed therein.

Another expandable/collapsible apparatus for forming the mouth-neck portion of a plastic bottle is disclosed in U.S. Pat. No. 4,397,629, which issued to M. Akutsu et al. on Aug. 9, 1983. The Akutsu et al. device comprises an expanding operation zone which is inserted into the mouth-neck portion of a heated preformed plastic parison. The operation zone is thereafter expanded radially thereby drawing the heated plastic against the walls of a surrounding mold. The Akutsu et al. patent also indicates that the outer peripheral wall of the expanding operation zone may be formed with a spiral screw-shaped protuberance to correspond with a screw groove formed in the surrounding mold to thereby form a continuous spiral screw in the mouth-neck portion of the preformed parison. The expanding operation zone is thereafter collapsed and withdrawn from the preformed parison to allow further blow-molding operations not specifically described.

An apparatus for blow-molding a tubular slug of thermoplastic material is also disclosed in U.S. Pat. No. 3,969,060, which issued to Otto Rosenkranz et al. on July 13, 1976. The Rosenkranz et al. equipment includes a split-mold cavity which closes about the heated tubular slug of thermoplastic material constricting the thermoplastic between the mold sections and a central core. Following constriction of the thermoplastic tube, the central core is displaced axially to compress the thermoplastic material in the upper portions of the mold into thread formations formed in the neck-forming area of the mold. After axial compression of the upper end of the tubular slug, the balance of the molded article is formed by introducing blow-molding pressure through the hollow tube of the central core.

Similarly, U.S. Pat. No. 4,115,496, which issued to T. J. Krall on Sept. 19, 1978, concerns a method of molding an internally threaded bunghole in a blow-molded container. As in the Rosenkranz et al. disclosure, the Krall reference describes an externally threaded rigid blow pin assembly which is extended into a plastic parison. A split mold is, thereafter, closed around such parison and rigid blow pin to compression mold the threaded bunghole. Blow-molding pressure is injected into the parison through a blow channel in the rigid blow pin. After blow-molding, the blow pin is unscrewed from the formed threads and the mold is separated to eject the container.

Despite all of the prior work done in this area, there remain problems of inefficiency in incorporating an expandable/collapsible core pin in a blow-molding manufacturing procedure to form a thermoplastic container having a neck-portion with internal attachment means therewithin. With prior art methods and apparatus, one was restricted to awkward multi-step procedures and/or limited to particular container shapes which could be made. Such restrictions resulted in inefficient and expensive manufacturing alternatives.

DISCLOSURE OF THE INVENTION

It is an object of this invention to obviate the above-described problems.

It is also an object of the present invention to provide a radially expandable core pin for blow-molding a thermoplastic container having a neck-portion with internal attachment means in an efficient and low cost manner.

It is another object of the present invention to provide an expandable core pin for blow-molding a thermoplastic container having a neck-portion with internal attachment means which can be conveninently utilized in conjunction with existing blow-molding machinery and procedures.

In accordance with one aspect of the present invention, there is provided a radially expandable core pin for blow-molding a thermoplastic container having a body-portion and a neck-portion, with such neck-portion including a dispensing orifice and internal attachment means. The core pin is radially expandable to compression mold the internal attachment means of the container and comprises a plurality of circumferentially disposed core sections surrounding the central axis of the core pin. These core sections are radially movable between a normally collapsed position and an expanded position, and have outer surfaces which mate along their longitudinal sides when radially displaced to expanded position to form a substantially continuous neck-forming surface thereabout. The neck-forming surface is relieved in a predetermined pattern to form the internal attachment means of the container. The core pin also includes expansion means for moving the core sections to expanded position, and blowing means formed through the core pin and adapted to be connected to a pressure source. The blowing means provides blow-molding pressure for forming the body portion of the thermoplastic container.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 4 is a fragmentary view of the expandable blow-molding core pin of FIG. 3, said core pin also being shown in expanded condition;

FIG. 5 is a bottom view of the expandable blow-molding core pin of FIG. 4, shown in collapsed position;

FIG. 6 is a bottom view of the core pin of FIG. 4, shown in expanded position;

DETAILED DESCRIPTION OF THE INVENTION

Figure 1:
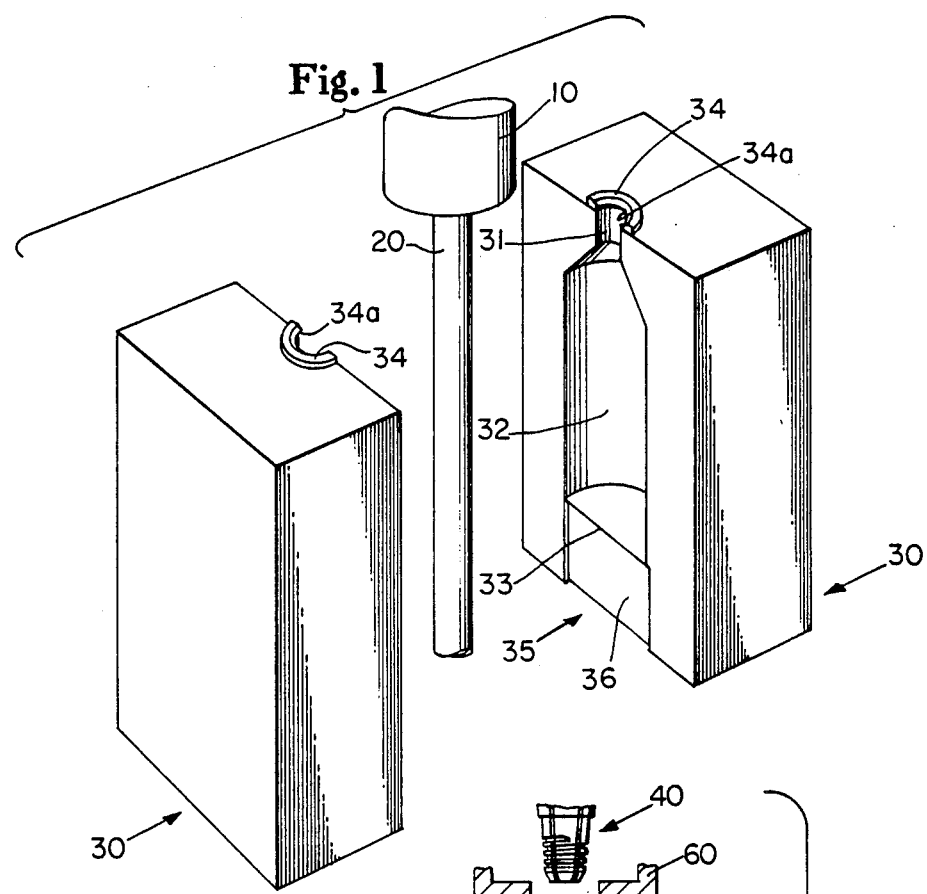
FIG. 1 is a perspective view showing an extruded hollow thermoplastic parison between two open female blow-molding mold sections.

Referring now to the drawings in detail, wherein like numerals indicate the same elements throughout the views, a hollow tubular parison 20 is shown in FIG. 1 as being downwardly extruded between two open female mold sections 30. The extruder 10 can be any of several commonly available parison extruders available in the blow-molding industry. Likewise, the female mold cavity 35 contemplated herein can be a standard blow-molding cavity designed to the shape of the desired container.

Specifically, mold cavity 35 comprises a neck-forming portion 31 and a body-forming portion 32. As is often the case in blow-molding mold cavities, the lower edge of the body-forming portion 32 of female mold cavity 35 is formed with a knife or pinch edge 33 designed to pinch off tubular parison 20 at the bottom of the body-forming portion 32 of mold cavity 35 thereby closing the lower end of heated parison 20 as the mold halves 30 are closed. Located adjacent and above neck-forming portion 31 on the upper surface of each of the female mold sections 30 is parison cut-off ring 34. As will be described in greater detail below, cut-off ring 34 includes an inwardly directed beveled edge 34a to facilitate removal of excess thermoplastic material on the upper end of mold cavity 35 during the molding procedure.

Figure 3:
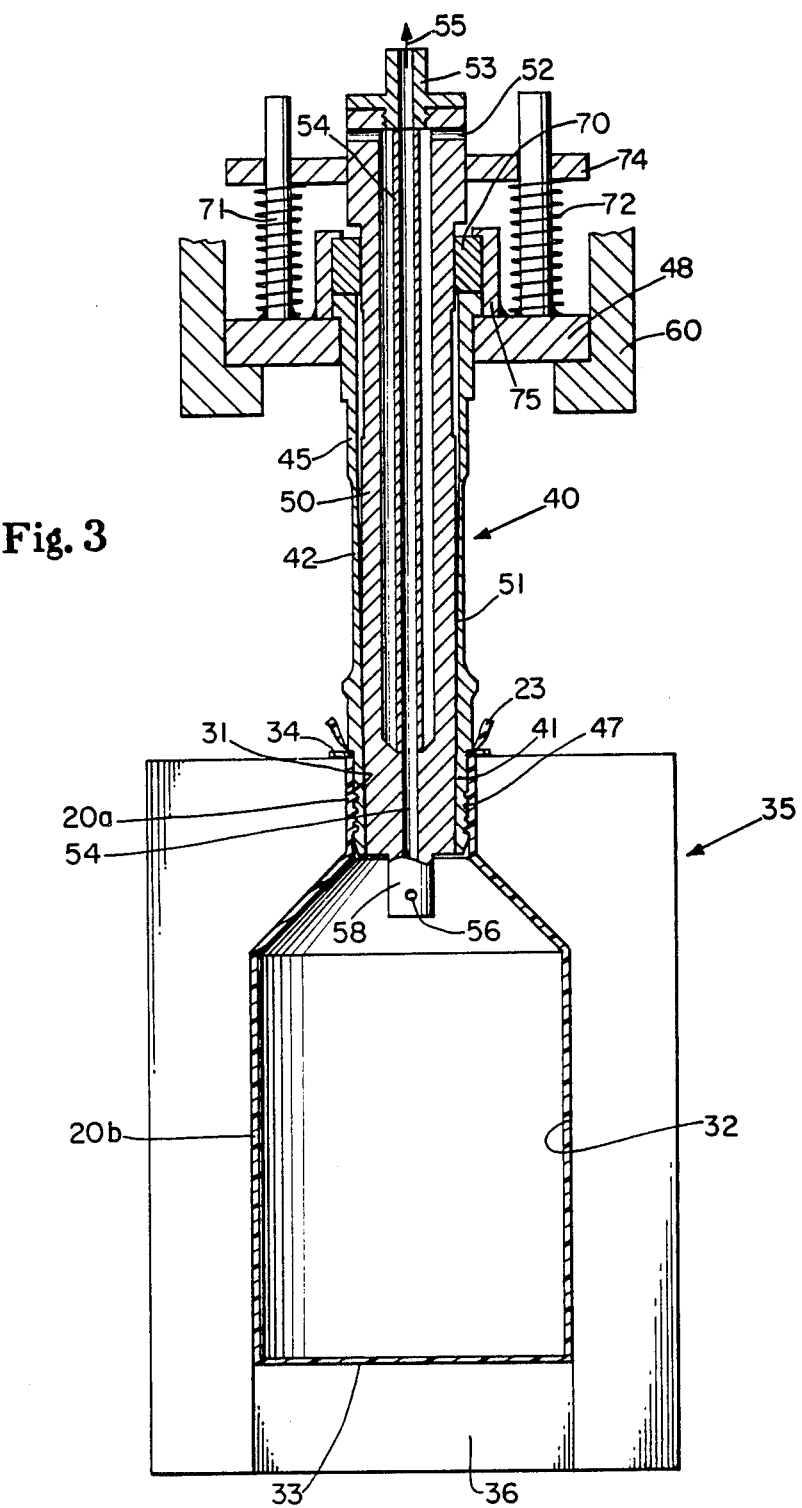
FIG. 3 is a fragmentary vertical cross-sectional view of the blow-molding apparatus of the present invention showing the collapsible core pin in expanded position and compressing the upper portion of the thermoplastic parison against the neck-forming portion of the closed female mold cavity during blow-molding procedures.

FIG. 3 illustrates mold cavity 35 as it would appear during blow-molding operations, wherein an expandable blow-molding core pin 40 is axially extended into the neck-forming portion 31 thereof. Expandable blow-molding core pin 40, as shown in FIGS. 4 through 6, comprises a plurality of circumferentially disposed expandable core sections 41a and 41b. Core sections 41a and 41b are radially movable between a normally collapsed position (as shown in FIG. 5) and an expanded position (as shown in FIG. 6). As also seen in FIGS. 5 and 6, each of the individual core sections 41a and 41b has an arcuate inner and outer surface. The inner arcuate surface of each core section 41a is shorter than the outer surface thereof, while the inner arcuate surface of each core section 41b is longer than the outer surface thereof. Each core section 41a has opposite longitudinal planar sides which converge toward an imaginary line disposed parallel to the central axis of core pin 40 and located between that core section 41a and such central axis. Similarly, each core section 41b has opposite longitudinal planar sides which converge toward the exterior of core pin 40. As seen best in FIG. 6, the outer arcuate surfaces mate along their contiguous longitudinal sides to form a substantially continuous neck-forming outer surface 46 thereabout when core sections 41 are radially displaced to expanded position.

The individual expandable core sections 41 are connected to the distal end of individual resilient connecting segments 42. Connecting segments 42 are cantilevered from core pin base 45 at their upper end. The resiliency of connecting segments 42 is designed to normally urge expandable core sections 41a and 41b toward their collapsed position shown in FIG. 5. Radially expandable/collapsible molding cores similar in nature to expandable core pin 40 are relatively abundant in the injection-molding industry, and it is contemplated that many of such collapsible/expandable molding cores could be adapted in accordance with the teachings herein for use in the blow-molding procedure of the present invention. One such collapsible core which can be adapted is available from DME, a Fairchild Industries Corporation, Dayton, Ohio. The DME collapsible core is also shown and described in U.S. Pat. No. 3,247,548, which issued to M. R. Fields et al. on Apr. 26, 1966, the disclosure of said patent being hereby incorporated herein by reference.

Connected about the upper periphery of core pin base 45 is guide flange 48. Guide flange 48 is shown as a preferred example of means to control or limit the axial travel of the expandable core pin 40 to properly align the expandable core sections 41 vertically within the neck-forming portion 31 of mold cavity 35 during the molding procedure.

An expansion pin 50 coaxially and slidingly extends within the expandable core sections 41 of core pin 40. As seen best in FIG. 3, expansion pin 50 has a tapered outer diameter 51 such that downward axial movement of expansion pin 50 radially forces expandable core sections 41 outwardly to the expanded position shown in FIGS. 3, 4 and 6. As expansion pin 50 is telescoped within expandable core sections 41, its increasing tapered diameter 51 begins to interfere with the inner surfaces of core sections 41b thereby forcing them radially outwardly. As is most apparent from the view in FIG. 5, outward radial movement of core sections 41b correspondingly forces core sections 41a radially outwardly as a result of the interaction of their oppositely converging adjacent longitudinal sides.

The particular amount and degree of taper of expansion pin 50 is preferably chosen such that outer diameter 51 supports the inner surfaces of expandable core sections 41 along substantially their entire longitudinal length during radial expansion thereof. Such uniform support is desirable to provide a more controlled expansion process which minimizes localized stresses on core sections 41. For example, an expansion pin 50 having a taper of approximately 25.4 mm. per 305 mm. of longitudinal length (approximately 1 inch per foot) has been found to provide sufficiently uniform support. An abrupt taper, on the other hand, might permit relatively high localized stresses during expansion procedures and thereby submit core sections 41 to unnecessary wear and tear and/or premature failure.

As shown in FIGS. 3 and 4, the outer surfaces of expandable core sections 41 are relieved in a predetermined pattern 47 to form the internal attachment means of the thermoplastic container to be molded. The pattern of such relieved areas 47 may be varied according to the number and type of internal attachment means desired. For example, it may be necessary to form internal threads, snap fitments, twist lock arrangements, or the like for various closures which may be attached to the neck of a container. Additional relieved areas can also be included to form an array of attachment means and/or undercut areas in the neck-portion of any particular container to accommodate other inserts (e.g. pouring adapter inserts, fitments and the like). As will be seen, relieved areas 47 are forced against the upper portions of the heated hollow parison 20 when the expandable core pin 40 is expanded. The expanding core sections 41 act to compression-mold the upper portions of tubular parison 20 against the neck-forming portion 31 of mold cavity 35 and into the relieved areas 47 of expandable core sections 41.

Within expansion pin 50 is formed a longitudinal blow-channel 54 which is adapted to be connected at its upper end to a pressure source 55 by additional tubes, hoses or similar means. The exact details and dimensions of blow-channel 54 and/or its connection to a pressure source are not critical, and any means of providing adequate blow-molding pressure through core pin 40 would equally suffice. It is preferred, however, that such blowing means be formed through expansion pin 50. As shown in FIGS. 3 and 4, blow channel 54 may be extended somewhat below the lower end of expansion pin 50 by means of a blow channel extension 58 which may include radially disposed exit ports 56 to direct pressure in a predetermined manner within tubular parison 20.

After expansion pin 50 has been axially extended downwardly forcing the expandable core sections 41a and 41b to radially compress the upper portions of the tubular parison 20 against the inner surfaces of the neck-forming portion 31 of mold cavity 35, the upper end of mold cavity 35 will be effectively sealed by core pin 40 and the compressed heated thermoplastic in the neck area. Such unique sealing action obviates a need for special sealing procedures and/or structures to facilitate blow-molding of parison 20. Pressure forced into tubular parison 20 via blow-channel 54 expands the balance of the parison against the inner surfaces of body-forming portion 32 of mold cavity 35. To facilitate the cooling of the formed neck-portion of the resulting container, the temperature of expansion pin 50, and expandable core pin 40 in general, is maintained within a desired range by cooling channel 52 which is formed within expansion pin 50. Cooling channel 52 is shown in FIG. 3 as concentrically arranged about the periphery of blow-channel 54, however, the specific structural details of such cooling means is not critical. Cooling fluid is supplied through cooling channel 52, and an appropriate baffle system (not shown) forces the cooling fluid to circulate throughout expansion pin 50. Plug 53 is fitted within the upper end of expansion pin 50 and includes fittings to provide connection of core pin 40 to molding pressure source 55.

Expandable core pin 40 is axially reciprocable to allow it to be moved into and out of mold cavity 35 as desired. While a stationary core pin 40 could be equally utilized in conjunction with an appropriately reciprocable mold cavity 35, the described setup is preferred in order to more readily adapt to conventional blow-molding procedures and equipment. Alignment bearing 70 maintains expansion pin 50 in a proper axial disposition within core pin 40, while guide flange 48 and die stops 60 interact to control the vertical movement of expandable core sections 41 to properly align them vertically within the neck-forming portion 31 of mold cavity 35 during molding procedures. Clamps 75 are illustrated simply as means to attach bearing 70, flange 48 and core base 45. Other attachment means could equally be employed.

To form a blow-molded thermoplastic container having a body-portion and a neck-portion provided with a dispensing orifice and internal attachment means, a hollow tubular parison 20 of thermoplastic material is first extruded. Any thermoplastic material which can be blow-molded can be used in the present process. A preferred material is high density polyethylene available from a variety of sources in the industry, (e.g. Chemplex 5602A, available from Chemplex Company, Rolling Meadows, Ill.). The dimensions and wall thickness of the extruded parison will vary according to several common variables such as the particular thermoplastic material chosen, as well as the size, shape and desired wall thicknesses of the container to be formed therefrom. Some extruding machines may also include a preset feature to profile the thickness of the parison in a predetermined form so as to insure a substantially uniform wall thickness of the resulting blow-molded container, or to provide additional plastic in critical areas. In the present process, it is preferable to profile the wall thickness of parison 20 such that additional thermoplastic material is present in the upper and lower portions to provide sufficient plastic to form the internal attachment means and the bottom of the container, respectively.

In one embodiment of the present process, high density polyethylene was extruded at a temperature slightly below its melting point (i.e. between about 380° and about 400° F., or between about 193° and about 204° C.), with such parison having an outside diameter of about 40 mm. and an inside diameter of about 38.5 mm (note—this parison was extruded with a substantially uniform wall thickness). From that parison, a bottle having an extended neck with an outside diameter of about 43.2 mm and an inside diameter of about 40.2 mm, and a body-portion with an outside diameter of about 70 mm was formed. Additionally, internal attachment means formed in the neck of the bottle extended inwardly therewithin approximately 1.2 mm.

As shown in FIG. 1, hollow tubular parison 20 is extruded downwardly a length L such that it will be slightly longer than the total height H of female mold cavity 35. Although a preformed parison could be used in this process, it is preferred that a continuously extruded parison be utilized so that substantially standard blow-molding techniques and equipment commonly available in the industry may be employed. When hollow tubular parison 20 is extruded to an approximate length L, female mold sections 30 of mold cavity 35 are closed therearound such that the upper end of parison 20 is located within the neck-forming portion 31 of mold cavity 35, and the lower end of parison 20 is pinched closed between corresponding pinch edges 33 in the lower portion of the female mold sections 30. This pinching action serves to close off the lower end of heated tubular parison 20 to permit formation of the bottom portion of the bottle during blow-molding procedures. Beneath the pinch edges 33 of mold 30 are undercut areas 36 which allow excess thermoplastic material 21 to be pinched off from tubular parison 20 without interfering with the complete closure of mold cavity 35. This excess thermoplastic material 21 may be removed by mechanical jaws (not shown) or other similar removal means known in the industry. The cross-sectional view of FIG. 3 shows the blow-molding apparatus and expanded parison 20 with excess material 21 removed from undercut area 36.

Figure 2:
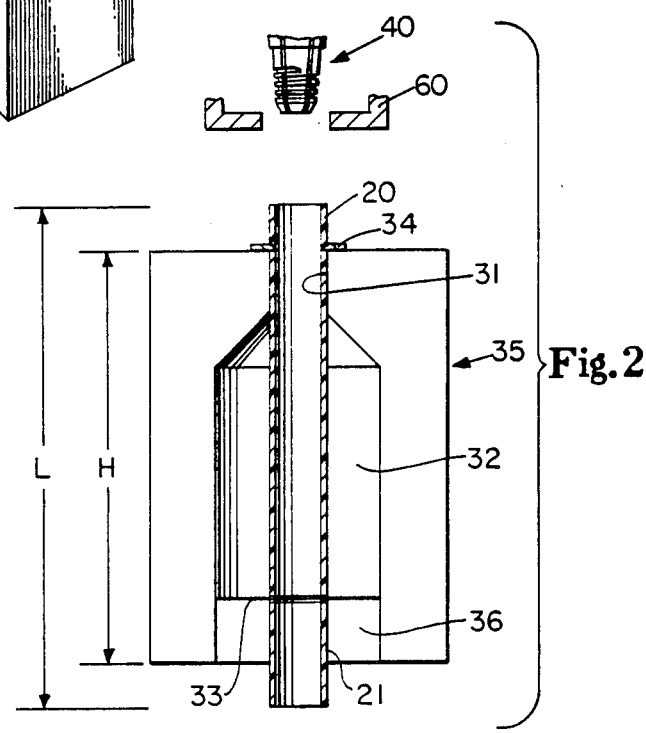
FIG. 2 is a fragmentary vertical cross-sectional view of the thermoplastic parison of FIG. 1 following closure of the female blow-molding mold sections therearound, the section being taken vertically between the two closed mold sections.

As the female mold sections 30 are closed around tubular parison 20, a stream of air may be continuously blown through parison 20 to prevent collapse of the parison within mold cavity 35. Preferably, as soon as female mold cavity 35 is closed about tubular parison 20, a parison severing means (not shown) separates tubular parison 20 from the balance of the continuous hollow extrudate depending from extruder 10 at a point slightly above the upper end of the closed mold cavity 35. Such parison cut-off can be accomplished by a variety of means known in the industry, such as a hot knife which passes above the mold 35 cutting off the parison. It is preferred that during this parison cut-off step a stream of air be continuously passed through tubular parison 20 to insure that the upper end thereof substantially retains its open tubular shape. At this point, as shown in FIG. 2, the mold cavity 35 contains tubular parison 20 with the open upper end of parison 20 aligned within the neck-forming portion 31 thereof. The open end of parison 20 held within the neck-forming portion 31 of the closed mold is then indexed below expandable core pin 40.

Expandable core pin 40 is then extended axially into the open end of tubular parison 20 and the neck-forming portion 31 of mold cavity 35. In this regard, die stops 60 insure proper vertical alignment of expandable core sections 41 of expandable core pin 40 within neck-forming portion 31 of the mold. As expandable core pin 40 is axially lowered into neck-forming portion 31, the expandable core sections 41 are in collapsed position and telescope into the open end of tubular parison 20 without interference therewith. As core sections 41 reach their lowest axial position within neck-forming portion 31, expansion pin 50 continues its downward axial movement therewithin and begins to expand core sections 41a and 41b thereby radially compressing the open upper end of hollow parison 20 against the neck-forming portion 31 of mold cavity 35 and into the relieved areas 47 on the exterior surface 46 of expandable core sections 41. The expansion of core sections 41 simultaneously brings the smooth upper lands 49 of neck-forming surface 46 into contact with the beveled edge 34a of cut-off ring 34 thereby cutting off any excess plastic 23 from the upper end of parison 20 and forming the upper edge of the neck-portion of the blow-molded container.

When expansion pin 50 reaches its lowest vertical position (as shown in FIG. 3), expandable core sections 41 of core pin 40 are fully expanded. It can also be seen that blow channel 54 extends into mold cavity 35 via the blow channel extension 58 thereby properly situating exit ports 56 for blow-molding procedures. Expansion of core sections 41 compresses the open upper end of parison 20 against neck-forming portion 31 of mold cavity 35 and thereby creates a seal of the upper end of mold cavity 35. Expansion pin 50 also creates a substantially tight seal between its outer surfaces and the inner surfaces of expandable core sections 41, thereby effectively sealing the entire upper end of mold cavity 35. Pressure introduced through blow-channel 54 expands the balance of parison 20 against the inner surfaces of the body-forming portion 32 of mold cavity 35. Although it may be helpful to supply some constant pressure to the interior of parison 20 throughout the molding process to prevent collapse thereof during the forming procedures, the main blow-molding pressure is preferably supplied simultaneously with or after mold cavity 35 has been effectively sealed by expansion of core pin 40. Standard blow-molding pressures are sufficient to complete the molding process (e.g. approximately 5.62 kg/cm$^2$ or about 80 psi is sufficient).

Cooling channel 52 of expansion pin 50 provides for transferral of heat away from expandable core pin 40 and the neck-forming portion 31 of the mold. Additionally, similar cooling means (not shown) may be used to control the temperature of the body-forming portion 32 of mold cavity 35 during molding procedures. When the expanded parison, shown as 20a and 20b in FIG. 3, has cooled sufficiently to retain its shape, mold sections 30 may be opened. To remove expandable core pin 40 from the neck-portion of the molded plastic container, expansion pin 50 is moved upwardly to permit expandable core sections 41 to resiliently return to their normally collapsed position. In this regard, attached to the upper surface of flange 48 are a pair of guide rods 71 which extend vertically therefrom and pass through bores in guide plate 74, which is connected to expansion pin 50. An axially compressible spring 72 surrounds each guide rod 71 and is held between flange 48 and guide plate 74. Guide rods 71, guide plate 74, and springs 72 illustrate a preferred post-molding core collapse assist system to insure that core sections 41 do not move vertically prior to their return to collapsed position as pin 50 is moved upwardly. As shown in FIG. 3, when expansion pin 50 is at its lowest vertical position, springs 72 are in an axially compressed condition resulting in exertion of downward force on flange 48. As expansion pin 50 is moved upwardly following the molding operation, springs 72 maintain downward force on flange 48 thereby allowing core sections 41 to collapse before any vertical movement thereof. Springs 72 should be designed to permit vertical movement of core sections 41 only following such collapse to prevent potential damage to the internal attachment means during withdrawal of core pin 40 from the neck-portion of the molded container. It should be noted that the particular details of this collapse assist system are not critical, and any system which insures collapse of core pin 40 prior to withdrawal from the neck-portion of the molded container could equally be employed.

With expandable core sections 41 in collapsed position, the core pin 40 may be withdrawn from the neck-portion of the molded plastic container without interference with any internal attachment means formed on the inner surface thereof. The precise order in which mold sections 30 and expandable core pin 40 are opened and removed, respectively, is not critical; and these procedures may be completed in any convenient order as determined by the particular blow-molding equipment being used (e.g. on some machines, core pin 40 may need to be removed before the mold sections 30 can be separated or vice versa). After removal of the finished container from the molding apparatus, the entire process may be repeated.

Figure 7:
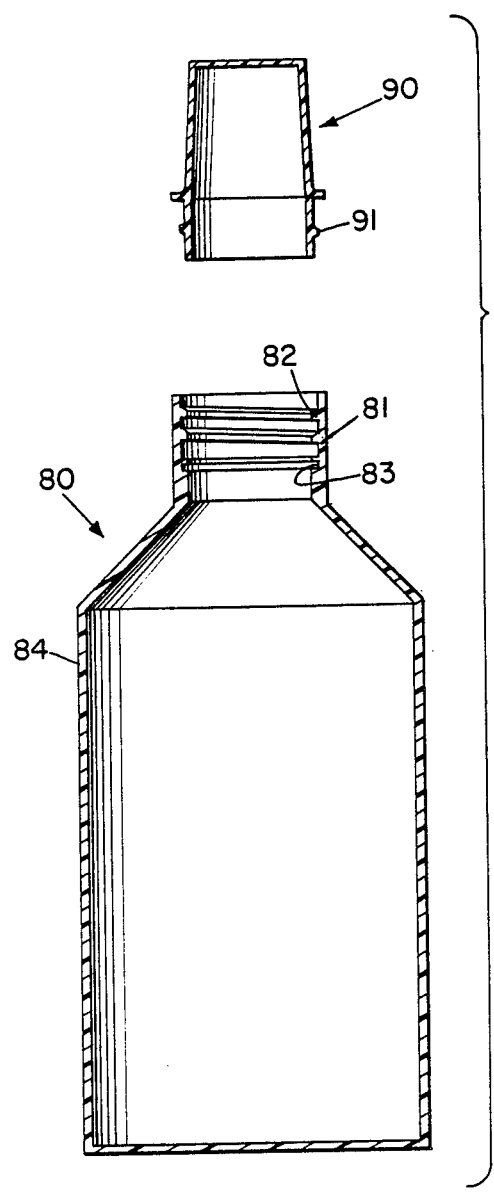
FIG. 7 is a vertical cross-sectional view of a blow-molded bottle having an extended neck-portion provided with internal attachment means made in accordance with the teachings herein.

FIG. 7 illustrates an example of a plastic bottle 80 which can be blow-molded in accordance with the described process. Bottle 80 includes an extended neck 81 provided with internal attachment means 82 and 83, and body portion 84. The external shape and the details of internal attachment means 82 and 83 for any particular container to be formed in accordance with this invention may be varied according to desired functional and aesthetic container characteristics. It is contemplated that a closure device 90 having external attachment means 91 may be used in conjunction with bottle 80. As shown in FIG. 7, closure device 90 may have external threads 91 designed to correspond with internal threads 82 of the bottle.

Figure 8:
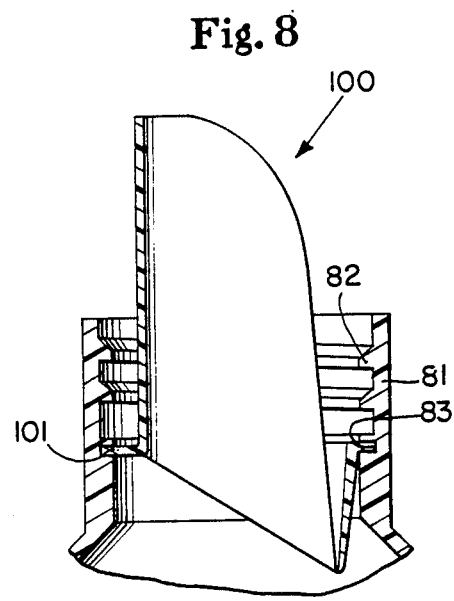
FIG. 8 is a fragmentary vertical cross-sectional view of the extended neck-portion of the blow-molded bottle of FIG. 7, with a pouring adapter insert attached therewithin.

FIG. 8 is a partial cross-sectional view of the neck-portion 81 of plastic bottle 80, in which a pouring adapter insert 100 has been mounted within internal attachment means 83 thereof. Pouring adapter insert 100 includes a peripheral snap flange 101 designed to fit snugly within the corresponding groove of additional attachment means 83. The specific structure of pouring adapter insert 100 and the corresponding internal attachment groove 83 are shown only as an example of the unlimited array of inserts and corresponding attachment means which may be utilized with plastic containers made in accordance herewith. As illustrated, closure 90 may also be used as a measuring cup for the contents of plastic bottle 80. In this regard, due to the mess-free advantages of external threads 91 of closure 90 and internal threads 82 of bottle 80, measuring cup closure 90 may be replaced on bottle 80 immediately after use without mess. Residual product within closure 90 will thereafter drain back into bottle 80 through insert 100.

Although a particular expandable core pin 40 has been shown and described herein, it is contemplated that other expandable core pins, such as many of the expandable core pins commonly available in the injection-molding industry, could be modified according to the teachings herein to function in this unique blow-molding process. Expandable core 40 is shown and described only as a preferred example of such apparatus.

Having shown and described the preferred embodiment of the present invention, further adaptions of the method and apparatus described herein can be accomplished by appropriate modifications by one of ordinary skill in the art without departing from the scope of the present invention. Accordingly, the scope of the present invention should be considered in terms of the following claims, and is understood not to be limited to the details of structure and operation shown and described in the specification and drawings.

We claim:

1. A radially expandable core pin for blow-molding a thermoplastic container having a body-portion and a neck-portion, said neck-portion including a dispensing orifice and internal attachment means, said core pin being radially expandable to compression mold said internal attachment means and comprising:
   (a) a plurality of circumferentially disposed core sections surrounding the central axis of said core pin, said core sections being radially moveable between a normally collapsed position and an expanded position and having outer surfaces which mate along their longitudinal adjacent sides to form a substantially continuous neck-forming surface thereabout when radially displaced to expanded position, said neck-forming surface being relieved in a predetermined pattern to form said internal attachment means of said thermoplastic container;
   (b) expansion means for moving the core sections to said expanded position, said expansion means comprising a tapered expansion pin; and
   (c) blowing means formed through said core pin and adapted to be connected to a pressure source for providing blow-molding pressure for forming the body portion of said thermoplastic container, said blowing means comprises an axial blow-channel formed through said tapered expansion pin and includes at least one radially disposed exit port.

2. The radially expandable core pin of claim 1, wherein said core pin further comprises an expandable end and a substantially non-expandable end, and wherein said circumferentially disposed core sections are located at said expandable end and are longitudinally split and resiliently cantilevered from said non-expandable end, said core sections being urged by said resiliency toward said collapsed position.

3. The expandable core pin of claim 2, wherein said tapered expansion pin is coaxially providing blow-molding pressure for forming the body-portion of said thermoplastic container, wherein said blowing means comprises at least one axial blow-channel extending longitudinally through said expansion pin and includes at least one radially disposed exit port.

4. A radially expandable core pin for blow-molding a thermoplastic container having a body-portion and a neck-portion, said neck-portion including a dispensing orifice and internal attachment means, said core pin being radially expandable to compression mold said internal attachment means and comprising:
   (a) an expandable end and a substantially non-expandable end, said expandable end further comprising a plurality of longitudinally split circumferentially disposed core sections attached at said non-expandable end of said core pin and surrounding the central axis of said core pin, said core sections being radially movable between a normally collapsed position and an expanded position, and having outer surfaces which mate along their longitudinal adjacent sides to form a substantially continuous neck-forming surface when radially displaced to expanded position, said neck-forming surface being relieved in a predetermined pattern to form the internal attachment means in said neck-portion of the thermoplastic container;
   (b) an expansion pin which is coaxially moveable within said core pin, said expansion pin having a tapered outer diameter such that axial movement thereof toward said expandable end of said core pin forces said core sections radially outwardly to expanded position; and
   (c) blowing means formed through said expansion pin and adapted to be connected to a pressure source for moveable within said core pin, and which, when axially moved toward said expandable end of said core pin, causes said core sections to radially expand and form said substantially continuous neck-forming surface adjacent said expandable end.

5. The expandable core pin of claim 4, wherein said longitudinally split core sections are resiliently cantilevered from said non-expandable end, with such resiliency urging said core sections toward said normally collapsed position.

6. The expandable core pin of claim 5, wherein said neck-forming surface is relieved in a helical thread pattern in order to form internal closure attachment threads within the neck-portion of said thermoplastic container.

7. The expandable core pin of claim 6, wherein said neck-forming surface further includes at least one additional relieved pattern designed to provide at least one additional attachment means on the internal surface of the neck-portion of said thermoplastic container.

8. The expandable core pin of claim 7 wherein said blow-channel extends below the lower end of said expansion pin and includes a plurality of radially disposed exit ports to direct said molding pressure within the body-portion of said thermoplastic container during blow-molding procedures.

* * * * *

UNITED STATES PATENT AND TRADEMARK OFFICE
CERTIFICATE OF CORRECTION

PATENT NO. : 4,578,028
DATED : March 25, 1986
INVENTOR(S) : William P. Dirksing et al.

It is certified that error appears in the above-identified patent and that said Letters Patent is hereby corrected as shown below:

Column 2, line 27, delete "convenienently" insert therefor --conveniently--.

Column 10, claim 3, should read as follows:
-- 3. The expandable core pin of claim 2, wherein said tapered expansion pin is coaxially moveable within said core pin, and which, when axially moved toward said expandable end of said core pin, causes said core sections to radially expand and form said substantially continuous neck-forming surface adjacent said expandable end. --

Column 10, claim 4, subparagraph(c) should read as follows:,
-- 4. (c) blowing means formed through said expansion pin and adapted to be connected to a pressure source for providing blow-molding pressure for forming the body-portion of said thermoplastic container, wherein said blowing means comprises at least one axial blow-channel extending longitudinally through said expansion pin and includes at least one radially disposed exit port. --

Claim 6, delete "claim 5" and insert therefor --claims 3 or 5-- .

Signed and Sealed this

Twenty-ninth Day of July 1986

[SEAL]

Attest:

DONALD J. QUIGG

Attesting Officer    Commissioner of Patents and Trademarks